United States Patent Office 3,532,694
Patented Oct. 6, 1970

3,532,694
CEPHEMOIC ACIDS AND PROCESS FOR PREPARING SAME
Gordon Alan Somerfield, High Wycombe, and David Chagouri, Hillingdon, England, assignors to Glaxo Laboratories Limited, Greenford, England, a British company
No Drawing. Filed Dec. 13, 1965, Ser. No. 513,595
Claims priority, application Great Britain, Dec. 23, 1964, 52,288/64
Int. Cl. C07d 99/24
U.S. Cl. 260—243
10 Claims

ABSTRACT OF THE DISCLOSURE

Cephemoic acids are prepared from the corresponding 3-hydroxymethyl analogues by aralkylating the 4-carboxy group, acylating the 3-hydroxymethyl group of the protected molecule, and subsequently removing the aralkyl group. There are provided new compounds of the formula $$C_6H_5CH_2 \cdot CONH \begin{array}{c} S \\ \diagup \\ \diagdown \end{array} CH_2OR$$
$$O = \begin{array}{c} | \\ N \end{array}$$
$$COOH$$

wherein R is a carboxylic acyl group of the formula:
(i) $R^1(CH_2)_nCO$— where $R^1$ is phenyl, tolyl or naphthyl and $n$ is an integer from 1 to 4,
(ii) $R^1CO$— where $R^1$ has the meaning defined above,
(iii) $C_nH_{2n+1}CO$— where $n$ is an integer from 2 to 7, or
(iv) diphenylacetyl, and pharmaceutically acceptable non-toxic salts thereof, and the formula $$C_6H_5CH_2 \cdot CONH \begin{array}{c} S \\ \diagup \\ \diagdown \end{array} CH_2OH$$
$$O = \begin{array}{c} | \\ N \end{array}$$
$$COOR^3$$

where $R^3$ is an aralkyl group.

The compounds of the first formula are useful as antibiotics and the compounds of the second formula are useful as intermediates for the preparation of the active compounds.

---

This invention is concerned with improvements in or relating to the production of analogues of cephalosporin C, and to novel analogues of cephalosporin C.

The compounds in this specification are generally named with reference to cepham which has the structure (I)

(see J.A.C.S., 1962, 84, 3400). The expression "cephemoic acid" is thus used herein to indicate a compound of the formula $$R^1NH \begin{array}{c} S \\ \diagup \\ \diagdown \end{array}$$
$$O = \begin{array}{c} | \\ N \end{array} \begin{array}{c} 3' \\ CH_2OR^2 \end{array}$$
$$COOH$$
(II)

where $R^1$ is a carboxylic acyl group and $R^2$ is a carboxylic acyl group which may or may not be the same as $R^1$.

Cephemoic acids having a 3-acyloxymethyl group, other than 3-acetoxymethyl, are generally of interest in that they possess modified antibiotic activity, as compared with the corresponding 3-acetoxymethyl compounds.

The 3-hydroxymethyl derivatives of the cephemoic acids have in certain cases already been proposed and a process for their preparation from the corresponding 3-acetoxymethyl compounds using an esterase derived from orange peel has been proposed in Belgian Pat. No. 602,342.

This invention is particularly concerned with a process for the production of cephemoic acids from the corresponding 3-hydroxymethyl analogues. This conversion is a generally difficult one to effect since the molecule is prone to lactone formation and also to rearrangement to the $\Delta^2$-compound. It has now been found that the conversion of the 3-hydroxymethyl group to a 3-acyloxymethyl group may conveniently be carried out if the 4-carboxy group is protected during the conversion. In particular it has been found that the protection may successfully be effected by aralkylation.

According to the present invention, therefore, there is provided a process for the preparation of cephemoic acids from the corresponding 3-hydroxymethyl analogues which comprises aralkylating the 4-carboxy group, acylating the 3-hydroxymethyl group of the protected molecule, and subsequently removing the aralkyl group.

Aralkyl groups which may conveniently be used in the process of the present invention include benzyl, benzhydryl and triphenylmethyl groups as well as nuclear substituted derivatives thereof such as bis(4-methoxyphenyl)methyl. The preferred aralkyl groups are however benzyl and substituted benzyl groups.

It is clearly desirable that the process according to the invention should be effected under conditions such that minimal $\Delta^3 \rightarrow \Delta^2$ isomerisation and/or lactonisation take place. The process according to the invention will now be described stepwise, it being understood that the reaction conditions described are not limiting.

(1) PREPARATION OF 3-HYDROXYMETHYL DERIVATIVES OF CEPHEMOIC ACIDS (STARTING MATERIAL)

The 3-hydroxymethyl (or desacetyl) cephemoic acids used as starting materials may be obtained from any convenient source. They may for example be prepared from cephalosporin C or a 7-acylamido analogue thereof by an enzymatic hydrolysis using an esterase derived from orange peel (loc. cit.). Strictly speaking this step is not part of the invention but is included for the sake of completeness.

(2) ESTERIFICATION (PROTECTION) OF 4-CARBOXY GROUP

Esterification reagents or methods which lead to lactonisation should desirably not be used. In consequence, the preferred esterification reagents are aryldiazoalkanes, particularly aryldiazomethanes. Alternatively, the ester may be prepared by reacting an aralkyl chloride or bromide with an alkali metal salt, e.g. the sodium salt, of the 3-hydroxymethyl cephemoic acid analogue. Examples of esters which may be prepared by this latter method are the 4-triphenylmethyl esters, nuclear substituted triphenylmethyl esters and 4-benzyl esters.

In general the diazo compound need only be used in the theoretical amount, and is conveniently used in solution in an anhydrous solvent such as diethyl ether or ethyl acetate. After the 4-ester has been obtained in this way and again with a view to avoiding lactone formation, it is preferable that the resultant solution is not taken to dryness. The 4-benzyl ester, for example, is difficult to redissolve or dry and is readily lactonized even by prolonged drying over anhydrous calcium chloride.

It is not normally necessary or convenient to purify the resultant ester for the subsequent acylation. It may be used in the form of a powder obtained by precipitation on adding the solution of the ester to about ten times its volume of an anti-solvent e.g. light petroleum (B.P. 40–60° C.). Care should however be exercised to prevent lactonization of the powder by not allowing it to remain in the dry state for extended periods.

(3) ACYLATION OF 3-HYDROXYMETHYL GROUP

The acylation may be carried out by any convenient method using for example an acid chloride, acid anhydride or a mixed acid anhydride as the acylating agent preferably in the presence of an organic base such as pyridine and carrying out the reaction in solution in an inert anhydrous solvent for example methylene chloride. The preferred acylating agent is the acid chloride since anhydrides require an undesirably long reaction time and tend to give a lower yield, again due to lactone formation. The acylation may conveniently also be carried out in aqueous acetone/sodium bicarbonate solution.

The acylation reaction should be effected as rapidly as possible, since under the conditions of the acylation rearrangement to the $\Delta^2$-derivative can occur, particularly when an aroyloxy group is being introduced at the 3'-position.

(4) REMOVAL OF PROTECTING GROUP AT 4-POSITION

The protecting group may be removed by any convenient method such as acid hydrolysis or hydrogenolysis.

The actual method of removal used will depend on the ease with which the protecting group can be removed. Some protecting groups may be readily removed by acid hydrolysis, others may require hydrogenolysis. A group which may be removed by hydrogenolysis is benzyl, while bis-(lower alkoxyphenyl)methyl may be removed by acid hydrolysis.

The protecting ester group may conveniently be acid hydrolysed where it yields, on acid hydrolysis, a relatively stable carbonium ion. The hydrolysis may be conveniently carried out under mild acid conditions e.g. employing dilute non-oxidizing mineral acids.

The hydrolysis conditions should be such that the protecting ester group is hydrolysed to give the 3-acyloxymethyl compound whilst avoiding (a) hydrolysis of the 3'-acyloxy group, (b) formation of lactone and (c) hydrolysis of the β-lactam ring. In fact some of (a), (b) and (c) will almost invariably take place but they can be reduced to a minimum with careful control of conditions.

Where the protecting group is to be removed by catalytic hydrogenolysis, the catalyst may for example be palladium e.g. on an inert support and the reduction being conveniently effected in a solvent such as glacial acetic acid or methanol. A particularly suitable catalyst for the reduction is 10% palladium on charcoal.

The 3'-acyloxy group may also become involved in the reaction when hydrogenolysis is used to remove the protecting group. Again with careful control of conditions this may be reduced to a minimum.

The presence of sulphur in the cephalosporin nucleus and especially in the 7-acylamido group may poison the catalyst used and inhibit the reduction. This difficulty may be overcome by the use of larger quantities of catalyst or better purification of the starting material before hydrogenolysis.

The 7-acyl group present on the cephemoic acid may for example be any one of the following groups bearing in mind that if these contain reducible functions they may be subject to reduction:

(i) $R'(CH_2)_nCO-$ where $R'$ is aryl, cycloalkyl, substituted aryl, substituted cycloalkyl or heterocyclic and $n$ is an integer from 1–4. Examples of this group include phenylacetyl, phenylpropionyl, thienyl-2-acetyl, thienyl-3-acetyl, and such a group in which $R'$ is cyclopentyl or cyclohexyl.

(ii) $C_nH_{2n+1}CO-$ where $n$ is an integer from 1–7. The alkyl group may be straight or branched and, if desired, may be interrupted by an oxygen or a sulphur atom or substituted by one or more halogen atoms. Examples of such groups include hexanoyl, heptanoyl, octanoyl and butylthioacetyl.

(iii) $C_nH_{2n-1}CO-$ where $n$ is an integred from 2–7. The alkenyl group may be straight or branched and, if desired, may be interrupted by an oxygen or a sulphur atom. Examples of such groups include acrylyl, crotonyl and allylthioacetyl.

(iv) $R'O.CR''R'''.CO-$ where $R'$ is as above defined and $R''$ and $R'''$ are the same or are different and each is a hydrogen atom or an alkyl, aryl or heterocyclic group. An example of such a group is phenoxyacetyl.

(v) $R'SCR''R'''.CO-$ where $R'$, $R''$ and $R'''$ are as defined above. Examples of such thio groups include S-phenylthioacetyl, S-chlorophenylthioacetyl and S-bromophenylthioacetyl.

(vi) $R'(CH_2)_mS(CH_2)_nCR''R'''.CO-$ where $R'$, $R''$ and $R'''$ are as defined above, $m$ is an integer from 1–4 and $n$ is 0 or an integer from 1–4. Examples of such a group include S - benzylthioacetyl, benzylthiopropionyl and β-phenethylthioacetyl.

(vii) $R'CO-$ where $R'$ has the meaning defined above. Examples of such groups include benzoyl, substituted benzoyl such as 2,6-dimethoxybenzoyl, and cyclopentanoyl.

The acyloxy group to be incorporated at the 3'-position may be any carboxylic acyloxy group, the carboxylic acyl group of which may be the same as in the list given above for the acyl groups at the 7-position. Greater yields will be obtained, in general, if the acyloxy group at the 3'-position is one which is not substantially affected by the removal of the protecting group at the 4-position.

Of the 3-acyloxymethyl compounds described above, those which have a substituted $-CH_2-$ group adjacent to the $-CO-$ in the 3-acyloxymethyl substituent are particularly preferred by reason of their antibiotic activity. Examples of such 3-acyloxymethyl groups include 4'-methylbenzoyloxymethyl, isobutyryloxymethyl, 2'-phenylpropionoxymethyl and benzoyloxymethyl. Another useful 3-acyloxymethyl group is 1'-naphthylacetoxymethyl.

The 4-aralkyl esters of the 3-hydroxymethyl cephemoic acid analogues are new compounds and are therefore included within the scope of the present invention as such, being useful intermediates but not generally possessing high antibiotic activity.

These intermediate compounds may be shown as having the structure:

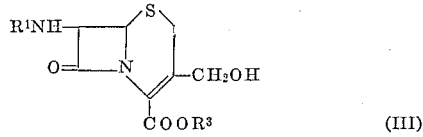

(III)

where $R^1$ is a carboxylic acyl group and $R^3$ is an aralkyl group.

Cephemoic acids of Formula II which are novel include those having the general formula:

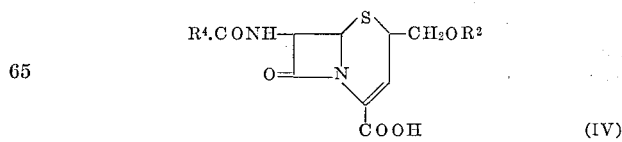

(IV)

where $R_2$ has the meaning defined above, other than acetyl, and $R^4$ represents an aralkyl group preferably a benzyl group and pharmaceutically acceptable non-toxic salts thereof. The salts may be metal, ammonium or amine salts, particularly alkali metal e.g. sodium salts. These compounds and salts are of particular interest as antibiotics.

The active compounds according to the invention may be formulated for administration in any convenient way by analogy with other antibiotic substances, such as penicillin and neomycin, and the invention thus includes within its scope a pharmaceutical composition comprising a compound of general Formula IV adapted for use in human or veterinary medicine. Such compositions may be presented for use in conventional manner with the aid of any necessary pharmaceutical carriers or excipients.

The compounds may thus be made up into injectable preparations either in solution or suspension in suitable media e.g. sterile, pyrogen-free water or as dry preparations suitable for the extempore preparation of injectable preparations. The compositions may further take the form of preparations for topical use e.g. lotions, ointments or creams, formulated with suitableexcipients for such preparations. The compositions may also take the form of tablets or capsules or liquids for oral administration.

For veterinary medicine the compounds may be formulated in a manner conventional in veterinary medicine particularly for injection as veterinary cerates.

The compounds according to the invention may be administered in combination with other antibacterial antibiotics especially the penicillins such as penicillin G and/or the tetracyclines.

In order that the invention may be well understood the following examples are given by way of illustration only. Ultraviolet absorption pertains to solutions in water or aqueous phosphate buffer at pH 6.0 Paper chromatography was usually carried out either on phosphate buffered paper or sodium acetate buffered paper, the chromatogram always being run downwards.

The phosphate buffered paper was prepared by dipping Whatman No. 1 paper (30 x 50 cm.) into a solution of anhydrous disodium hydrogen phosphate 7.05 g.) in water (2.5 litres; 0.03 M) adjusted to pH 6 with phosphoric acid and drying at 37° C. overnight. The paper chromatograms were then run using an n-butanol-ethanol-water solvent (4:1:5; parts by volume). This system is referred to as BEW in the examples.

The sodium acetate buffered paper was prepared by dipping Whatman No. 1 paper (30 x 30 cm.) into a solution of hydrated sodium acetate (13.6 g.) in water (1 litre; 0.1 M) adjusted to pH 5 with acetic acid, and drying. The paper chromatograms were run using an ethyl acetate; sodium acetate solvent system having a pH of 5.0. This system is referred to as EtOAc in the examples.

Woelm Acid alumina was used after deactivation to the Brockmann grade shown in the examples. In some cases, unbuffered Whatman No. 1 paper was employed with benzene-cyclohexane-methanol-water (5:5:6:4 by vol.) as solvent. This system is referred to as BCMW in the examples. All three chromatographic systems utilised the top phase of the solvent systems as mobile phase.

The light petroleum used in the examples had B.P. 40–60°C. unless otherwise stated.

The hydrogenations in the examples were carried out at room temperature and pressure. The theoretical uptake of hydrogen refers to that for hydrogenolysis of aralkyl ester group only. For the sake of brevity 3-acetoxymethyl-7-phenyl-acetamidoceph-3-em-4-oic acid is referred to as 7PACA.

EXAMPLE 1

(a) Benzyl 3-hydroxymethyl-7-phenylacetamidoceph-3-emoate

A vigorously stirred mixture of sodium 3-hydroxymethyl-7-phenylacetamidoceph-3-emoate (5 g.: 79% pure), water (100 ml.) and ethyl acetate (100 ml.) was slowly acidified to pH2 with dilute hydrochloric acid.

The ethyl acetate was separated and the aqueous solution extracted with ethyl acetate (2× 20 ml.). This solution was washed with water (2× 50 ml.) dried and treated with phenyldiazomethane (1.20 g.) in ether (150 ml.). After 30 min., the solution was extracted with N-NaHCO₃ solution (4× 15 ml.) and water (30 ml.). The ultraviolet absorption of the combined washings showed the presence of 33% of the starting material. The dried ethyl acetate was concentrated to a volume of 50 ml., added to light petroleum (500 ml.) and the solid separated. The ester was dried at room temperature and pressure for several hours and had M.P. 121–127° C., λ max. 258 mμ

$$E_{1\,cm.}^{1\%} = 176$$

In other preparations, the ester had M.P.'s in the range 120–145°, probably dependent on purity and the amount of solvent occluded in the material. The solid gave the following peaks in the infrared spectrum (CHBr₃): 1780 (β-lactam >C=O) 1705 (—CO.O.Bz) 1680 and 1500 (—CONH) and 1250 cm.⁻¹ (CO.O.Bz).

(b) Acetylation of benzyl 3-hydroxymethyl-7-phenyl-acetamidoceph-3-emoate

The benzyl ester from Example 1(a) (200 mg.) was treated with a mixture of acetic anhydride (5 ml.) and pyridine (5 ml.) at room temperature for several hours. The mixture was then poured onto ice and a colourless solid separated. Crystallisation from methanol yielded colourless needles M.P. 151.5–153° C. mixed M.P. with 7PACA benzyl ester 150–152° C. The infrared spectrum (CHBr₃) was identical with that of 7PACA benzyl ester in Example 1(c).

(c) Benzyl 3-acetoxymethyl-7-phenylacetamidoceph-3-emoate (7PACA benzyl ester)

A solution of 3-acetoxymethyl-7-phenylacetamidoceph-3-emoic acid (1.0 g.) in ethyl acetate (50 ml.) was treated with phenyldiazomethane (0.30 g.) in ether (20 ml.). After 30 min., the solution was extracted with N-NaHCO₃ solution, washed with water and dried to yield a yellow solid (1.0 g.). Crystallisation from methanol yielded the benzyl ester as pale yellow needles M.P. 151–153° C. The infrared spectrum (CHBr₃) had peaks at 1800 (β-lactam >(C=O), 1745 (0.CO.CH₃), 1690 (>C=O.Bz, —CO.NH) 1510 (—CO.NH—) and 1230 (broad) cm.⁻¹ (ester groups).

EXAMPLE 2

3-phenylacetoxymethyl-7-phenylacetamidoceph-3-emoic acid

A solution of benzyl 3-hydroxymethyl-7-phenylacetamidoceph-3-emoate (2.0 g.) in dry methylene chloride (30 ml.) and pyridine (5 ml.) was slowly treated with phenylacetyl chloride (1.0 ml.) in methylene chloride (5 ml.) and then stirred at room temperature for 4½ hr. The solution was shaken with N-NaHCO₃ solution (10 ml.) for 5 min. and then washed with 2 N HCl (2× 15 ml.), N-NaHCO₃ (2× 15 ml.) and water (30 ml.). The dried methylene chloride solution was evaporated to yield a yellow froth (2.66 g.) which was purified by alumina chromatography (Grade V). Elution with benzene (50 ml.) yielded a yellow froth (2.24 g.) from which the phenylacetylated ester was obtained as an almost colourless solid (0.30 g.) on treatment with methanol (40 ml.). The solid had M.P. 120–124° C. λ max. 258 mμ

$$E_{1\,cm.}^{1\%} = 118$$

The methanolic solution (containing 1.94 g. of substrate) was added to 10% palladium on charcoal (4.0 g.), previously shaken in methanol (15 ml.) with hydrogen for 30 min., and the mixture shaken for 15 min., in which time hydrogen (86 ml. 90% of theoretical uptake) was absorbed. The catalyst was separated, washed with methanol and the combined methanol solution evaporated. Ultraviolet absorption measurements showed that 55% of the substrate had been recovered. The product was dissolved in ethyl acetate (60 ml.) and extracted with N-NaHCO₃. Evaporation of the dried ethyl acetate solution gave a yellow gum (316 mg. 16%). The N-NaHCO₃ solution was acidified and extracted with ethyl acetate. Evaporation of the dried ethyl acetate solution yielded a colourless froth (818 mg., 42%) shown to be a mixture of the 3-phenylacetoxymethyl derivative and the 3-methyl derivative by paper chromatography (EtOAc). The mixture was partially separated by countercurrent distribution between ethyl acetate and 0.1 M. phosphate buffer (pH=5.0) (50 ml. each phase) using the "5 diamond" technique of Bush and Densen (Analyt. Chem. 1948, 20, 121). The 3-phenylacetoxymethyl derivative was present in fractions 1 and 2 (EtOAc) and the methyl derivative in all ten fractions. Complete separation was achieved when the "5 diamond" distribution was repeated on the material (590 mg.) recovered from fractions 1 and 2, the product being isolated from fractions 1 and 2 of this second distribution by treatment of the resultant gum with ether. The 3-phenylacetoxymethyl derivative was obtained as a colourless solid (194 mg.) M.P. 147–149° C. (decomp.) λ max. 259 mμ

$$E^{1\%}_{1\,cm.} = 206$$

The infrared spectrum (CHBr₃) had peaks at 1765 (β lactam >C=O), 1730

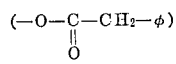

1695 (—COOH) 1680 and 1505 cm.⁻¹ (—CO—NH—)

R₇PACA EtOAc=2.5
BEW=1.3

EXAMPLE 3

3-(4-methylbenzoyloxymethyl)-7-phenylacetamidoceph-3-emoic acid

An ethyl acetate solution of benzyl 3-hydroxymethyl-7-phenylacetamidoceph-3-emoate was prepared from the sodium salt (5.0 g., 60% pure) and phenyldiazomethane 1.08 g.) as described in Example 1. This solution was concentrated (to ca. 50 ml.) methylene chloride (100 ml.) added and the mixture evaporated to about 30 ml. Methylene chloride (30 ml.), pyridine (5 ml.) and 4-methylbenzoyl chloride (2 ml.) were added and the solution stirred at room temperature for 3 hrs. The reaction mixture was worked up as described in Example 1 to yield a brown gum (5.3 g.) which was dissolved in ethyl acetate (30 ml.) and added to light petroleum (400 ml.). On standing for 15 hours the benzyl ester was obtained as a colourless solid (3.14 g., 74%). The infrared spectrum showed a strong peak at 1730 cm.⁻¹.

The solid was reduced as described in Example 1 using methanol (100 ml.) with 10% palladium on charcoal (10.0 g.) and hydrogen (100 ml.) (70% of the theoretical uptake) of hydrogen was absorbed in 70 min. The recovery of substrate from the reduction was 46% by ultraviolet absorption measurements. The methanolic solution was evaporated and an ethyl acetate (50 ml.) solution of the residue extracted with (i) N-NaHCO₃ solution (2× 20 ml.), (ii) M-Na₂CO₃ solution (2× 20ml.), and (iii) N/100-NaOH (2× 20 ml.). Each aqueous extract was acidified, extracted with ethyl acetate and the dried solutions evaporated to yield (i) pale brown solid 384 mg.—a mixture of the 3(4-methylbenzoyloxymethyl) and 3-methyl derivatives and a third substance, (ii) pale brown solid 58 mg.—a mixture of the 3-(4-methylbenzoyloxymethyl) and 3-methyl derivatives and a third substance, and (iii) brown solid 150 mg.—mainly the 3-(4-methylbenzoyloxymethyl) derivative with a trace of the third substance. The original ethyl acetate solution yielded a gummy brown solid (756 mg.) on evaporation. The weight recovery was 43%. (i) and (ii) were combined and fractionated by a "5 diamond" countercurrent distribution between ethyl acetate and 0.1 M phosphate buffer (pH 5.5) (50 ml. each phase) to give a mixture (190 mg.) of the 3-(4'-methylbenzoyloxymethyl) derivative (R_F=0.63) and the third substance (R_F=0.95 in EtOAc). The mixture had λ max. 235 mμ

$$E^{1\%}_{1\,cm.} = 580$$

The solid from (iii) had λ max. 245 mμ

$$E^{1\%}_{1\,cm.} = 382$$

The infra-red spectrum (CHBr₃) had peaks 1800 (β-lactam >C=O) 1715

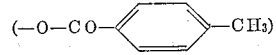

1690 (—COOH and —CO—NH—) and 1505 cm.⁻¹ (—CO—NH—). On this evidence, this solid was formulated as 3-(4-methylbenzoyloxymethyl)-7-phenylacetamidoceph-3-emoic acid. It is likely that the faster moving product is the ceph-2-emoic acid.

R₇PACA EtOAc=4.8
BEW=1.2

EXAMPLE 4

3-propionoxymethyl-7-phenylacetamidoceph-3-emoic acid

A solution of benzyl 3-hydroxymethyl-7-phenylacetamidoceph-3-emoate (2.3 g.) in dry methylene chloride (20 ml.) and pyridine (5 ml.) was treated with propionic anhydride (5 ml.) for 4 hrs. at room temperature. The reaction mixture was treated in the usual way to yield a brown oil which solidified on washing with ether. A small amount of the resultant solid was retained and the remainder (1.5 g.) hydrogenated in methanol (125 ml.) with 10% palladium on charcoal (4 g.) as catalyst. Hydrogen (67.5 ml., 95% of theoretical amount) was absorbed in 130 min. and the solution worked up as described in Example 1 (recovery 52%). The hydrogenation product was fractionated with N-NaHCO₃ solution to yield (i) NaHCO₃ insoluble fraction (572 mg.)—a colourless froth shown to contain starting material on paper chromatography; (ii) NaHCO₃ soluble fraction (352 mg.)—a mixture of the propionate and 3-methyl derivative.

The NaHCO₃— insoluble fraction from the first reduction was reduced again with 10% palladium on charcoal (1.5 g.) in methanol. Hydrogen (17 ml., 63% theoretical) was absorbed in 30 min. and the mixture fractionated as before to yield (iii) NaHCO₃ insoluble gum (255 mg.) and (iv) NaHCO₃— soluble solid (139 mg.), which was shown to be a mixture of the propionate and 3-methyl derivative. However, in contrast to (ii), the major component of the mixture appeared to be the 3-methyl derivative.

Fractions (ii) and (iv) were combined and separated by countercurrent distribution (145 transfers) between ethyl acetate and 0.1 M phosphate buffer (pH=5.0) in a 50-tube apparatus coupled to an automatic fraction collector. Fractions were examined by paper chromatography and the propionate (175 mg.) obtained as a brown gum from fractions 30–70. The 3-methyl derivative was present in fractions 80–120. The brown gum was crystallised from methanol to yield the desired propionate as a colourless solid (58 mg.) λ max. 257 mμ

$$E^{1\%}_{1\,cm.} = 217$$

R₇PACA EtOAc=2.2
BEW=1.1

EXAMPLE 5

3-caproyloxymethyl-7-phenylacetamidoceph-3-emoic acid

Benzyl 3-hydroxymethyl-7-phenylacetamidoceph-3-emoate (2.0 g.) was acylated with caproyl chloride using the procedure given in Example 1 to yield, after alumina chromatography, a pale brown solid (1.935 g.). The infrared spectrum (CHBr₃) of the solid had peaks at 1800 (β lactam >C=O), 1745

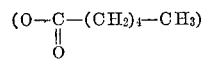

and 1680 cm.⁻¹ (—CO.OBz and —CONH—). The solid was reduced in methanol (100 ml.) with 10% palladium on charcoal (6 g.) as catalyst. Hydrogen (96 ml., 105% of theoretical absorption) was absorbed in 15 min. and 61% of the substrate was recovered from the reaction mixture. The product was fractionated in the usual way to give (i) NaHCO$_3$ insoluble froth (734 mg.) and (ii) NaHCO$_3$ soluble gum (488 mg.). The latter fraction (ii) was shown to be a mixture of the 3-caproyloxymethyl derivative and the 3-methyl derivative. Paper chromatography also showed that some of the product remained in fraction (i). Fraction (ii) was fractionated by countercurrent distribution (10 transfers) between ethyl acetate (5×50 ml.) and 0.1 M phosphate buffer (pH 5.5; 10× 50 ml.) and the product isolated from fractions 3–5 (EtOAc) and 6–10 (buffer) as a brown gum (249 mg.). The caproate was finally obtained as a colourless solid (162 mg.) λ max. 266 mµ

$E_{1cm.}^{1\%}$ 82

R$_{7PACA}$ EtOAc=4.0
BEW =1.2

EXAMPLE 6

3-(1-naphthylacetoxymethyl)-7-phenylacetamidoceph-3-emoic acid

Benzyl 3 - hydroxymethyl-7-phenylacetamidoceph - 3-emoicacid (4.15 g.) was acylated with 1-naphthylacetyl chloride using the procedure given in Example 1 to yield the crude ester as a brown solid (6.1 g.). After purification by crystallisation from benzene and alumina chromatography of the mother liquors, the resultant colourless solid (4.3 g.) was hydrogenated in the usual way in methanol (150 ml.) and dioxan (10 ml.) with 10% palladium on charcoal (12.5 g.) as catalyst. Hydrogen (100 ml., 57% of theoretical uptake) was absorbed in 30 min. and the reaction mixture worked up in the usual way to give (i) NaHCO$_3$ insoluble froth (1.460 g.), (ii) NaHCO$_3$ soluble solid (449 mg.). Paper chromatography showed some of the 3-(1-naphthylacetoxymethyl) derivative to be present together with the 3-methyl derivative. (iii) N/100 NaOH soluble brown gum (300 mg.)— this fraction only contained the 3-(1-naphthylacetoxymethyl) derivative. The residual gum from this fractionation was hydrogenated again with 10% palladium on charcoal (3 g.) and the product (120 mg.) obtained by extraction with N/100-NaOH. The recovery in both reductions was about 45%.

The different fractions containing the product (440 mg.) were combined and treated with sodium ethyl hexanoate in n-butanol to yield sodium 3-(1-naphthylacetoxymethyl)-7-phenylacetamidoceph-3-emoate as a colourless solid (168 mg.) λ max. 263 (infl.) 270, 278 (infl.) and 291 (infl.) mµ

$E_{1cm.}^{1\%}$=243, 255, 218 and 100

R$_{7PACA}$ EtOAc=3.6
BEW=1.2

EXAMPLE 7

3-isobutyryloxymethyl-7-phenylacetamidoceph-3-emoic acid

The benzyl ester prepared from crude 3-hydroxymethyl-7-phenylacetamidoceph-3-emoic acid (8.0 g.; 45% pure) was acylated with isobutyryl chloride (2 ml.) using the procedure given in Example 1 to yield, after trituration with dry light petroleum, a yellow solid (3.24 g.). The infrared spectrum (CHBr$_3$) had peaks at 1790, 1740 and 1680 cm.$^{-1}$ confirming that the acylation had taken place. Starting material (15%) was recovered from the benzylation.

The ester was hydrogenated in acetic acid (100 ml.) with 10% palladium on charcoal as catalyst and hydrogen (142 ml., 92% of theoretical) was absorbed in 28 min. The recovery of substrate from the hydrogenation was estimated at 90% by ultraviolet absorption measurements and the product was fractionated to yield (i) N/100—NaOH soluble solid (113 mg.), (ii) NaHCO$_3$ soluble solid (0.846 g.), (iii) N/100—NaOH insoluble gum (1.5 g.).

Paper chromatography showed (i) and (ii) to be a mixture of the 3-isobutyryloxymethyl derivative and the 3-methyl derivative and this was separated by a "5 diamond" countercurrent distribution between ethyl acetate (300 ml. per phase) and 0.1 M phosphate buffer (pH 5.5; 75 ml. per phase). Only the 3-isobutyryloxymethyl derivative (358 mg.) was present in fraction 1 and it was treated with sodium ethyl hexanoate (175 mg.) in butanol (5 ml.). The sodium salt did not separate and the solution was evaporated. Addition of ether to the residual gum yielded a colourless solid containing the 3-isobutyryloxymethyl derivative (180 mg.) λ max. 258 mµ

$E_{1cm.}^{1\%}$=100

R$_{7PACA}$ EtOAc=3.2
BEW=1.2

EXAMPLE 8

Preparation of 3-diphenylacetoxymethyl-7-phenylacetamidoceph-3-emoic acid

Crude 3 - hydroxymethyl - 7-phenylacetamidoceph-3-emoic acid (8.0 g. 45% pure) was benzylated and acylated with diphenylacetyl chloride (2.8 g.) as in Example 1, to yield, after trituration with light petroleum (B.P. 60–80°), a brown solid (4.81 g.). The infrared spectrum (CHBr$_3$) had peaks at 1790 (β-lactan >C=O) 1735 (O.CO.CHφ$_2$) and 1690 cm$^{-1}$ (—CO.NH—) indicating acylation had taken place.

The resulting benzyl 3-diphenylacetoxymethyl-7-phenylacetamidoceph - 3 - enoate (4.81 g.) was hydrogenolysed in acetic acid (100 ml.) with 10% palladium on charcoal (12.5 g.) as catalyst. Hydrogen (160 ml. 87% theory) was absorbed in 60 min. The mixture was filtered, evaporated and the residue dissolved in ethyl acetate (A). Extraction with N-NaHCO$_3$ and N/100 NaOH removed only a small quantity of the product together with all the 3-methyl-7-phenylacetamidoceph-3-emoic acid produced during hydrogenolysis. The two solutions yielded a brown gum (162 mg.) when combined and extracted with ethyl acetate. The residual ethyl acetate solution from the base extraction of A was shown by paper chromatography (EtOAc) to contain most of the 3-diphenylacetoxymethyl-7-phenylacetamidoceph-3-emoic acid, which was removed by repeated extraction with N/100 NaOH (6× 100 ml.). The combined aqueous solutions were acidified and extracted with ethyl acetate (3× 200 ml.). Evaporation of the dried ethyl acetate solutions yielded, after washing with ether, a colourless solid (230 mg.) λ max. 285mµ

$E_{1cm.}^{1\%}$=212

1 µg.≡0.24 µg. 7PACA on cup plate assay (10% aqueous DMF).

R$_{7PACA}$ EtOAc=3.8
BEW=1.7

EXAMPLE 9

Preparation of 3-(2-phenylpropionoxymethyl)-7-phenylacetamidoceph-3-emoic acid

A solution of benzyl-3-hydroxymethyl-7-phenylacetamidoceph-3-emoate prepared as in Example 1 (from sodium 3 - hydroxymethyl - 7 - phenylacetamidoceph-3-emoate (8.6 g. 45% pure) in dry ethyl acetate-methylene chloride (70 ml.; 1:1) and pyridine (5 ml.) was acylated with 2-phenylpropionyl chloride (4 ml.) at room temperature for 3 hrs. The reaction mixture was treated as in Example 1 to yield, after filtration through alumina (Grade V) in benzene, a brown oil (4.9 g.). The infrared spectrum (natural film) had peaks at 1810 (lactone), 1790 (β-lactam>C=O), 1735 [O.CO.CH(CH)$_3$φ] and 1690 cm.$^{-1}$ and paper chromatography (BCMW) showed the oil to be a mixture of benzyl-3-(2-phenylpropionoxymethyl)-7-phenylacetamidoceph-3-emoate, and 3-hydroxymethyl-7-phenylacetamidoceph-3-emoic acid lactone. This latter compound was responsible for the 1810 cm.$^{-1}$ peak (lactone $>$C$=$O) in the infrared spectrum.

The oil was hydrogenolysed with 10% palladium on charcoal (16 g.) in acetic acid (100 ml.) and hydrogen (230 ml. 115% theory) was absorbed in 15 min. The reaction mixture was worked up in the usual manner and the 3-(2-phenylpropionoxymethyl) - 7 - phenylacetamidoceph-3-emoic acid (507 mg.) isolated as a brown gum from fractions 1 and 2 (EtOAc) of a "5-diamond" countercurrent distribution between ethyl acetate and 0.5 M phosphate buffer (pH=5.0) on the N-NaHCO$_3$ and N/100 NaOH extracts. 3-methyl-7-phenylacetamidoceph-3-emoic acid (650 mg.) was isolated as sticky brown prisms from fractions 6–10 inclusive. The desired product could not be crystallised. A 70% aqueous ethanol solution was titrated with N/100 sodium hydroxide to pH=7.1. The ethanol was evaporated in vacuo and the residual aqueous solution freeze-dried to yield a hygroscopic powder (320 mg.), λ max. 258 mμ

$$E_{1\,cm.}^{1\%}=172$$

1 μg.≡0.8 μg. 7PACA on cup plate assay.

R$_{7APCA}$ EtOAc=2.5

EXAMPLE 10

Preparation of 3-(2-ethylhexanoyloxymethyl)-7-phenylacetamidoceph-3-emoic acid

Crude 3 - hydroxymethyl - 7 - phenylacetamidoceph-3-emoic acid (obtained from the sodium salt, 7.8 g. 45% pure) was benzylated and acylated, as in Example 1, to yield, after alumina chromatography, an oily solid. The infrared spectrum (CHBr$_3$) had peaks at 1800 (β-lactam $>$C$=$O), 1740 (O.CO.CH(Et)(CH$_2$)$_2$—CH$_3$) and 1690 cm.$^{-1}$ and paper chromatography (BCMW) showed that some 3 - hydroxymethyl-7-phenylacetamidoceph-3-emoic acid lactone was also present.

The crude benzyl - 3 - (2 - ethylhexanolyoxymethyl)-7-phenylacetamidoceph-3-emoate was hydrogenolysed in the usual way with 10% palladium on charcoal and hydrogen (64 ml. 46% theory) was absorbed in 40 min. The mixture was worked up in the usual way to give an ethyl acetate solution which was extracted with:

(i) N-NaHCO$_3$ (3× 50 ml.) which gave a brown oil (210 mg.) when acidified and extracted with ethyl acetate.
(ii) N/100 NaOH (6× 50 ml.) which gave a brown oil (161 mg.) when acidified and extracted with ethyl acetate.
(iii) Sodium phosphate buffer pH=11.8 (2× 25 ml.).

The second extract had pH=10.5 and the combined extracts yielded a brown oil (131 mg.).

The desired product was shown by paper chromatography (EtOAc) to be present in all three extracts, and was isolated as a brown oil (314 mg.) from fractions 1–3 (EtOAc) inclusive of a "5 diamond" countercurrent distribution between ethyl acetate (100 ml. each phase) and 0.5 M phosphate buffer (pH=6.5, 50 ml. each phase). 3-methyl-7-phenylacetamidoceph-3-emoic acid (169 mg.) was isolated from fractions 8–10 (EtOAc) inclusive.

A solution of the oil in 70% aqueous ethanol (30 ml.) was titrated with N/100 NaOH to pH=7.1. The ethanol was evaporated and the residual aqueous solution freeze-dried to leave a brown hygroscopic solid (250 mg.) λ max. (infl.) 260 mμ

$$E_{1\,cm.}^{1\%}=145$$

1 μg.≡0.43 μg. 7PACA on cup plate assay.

EXAMPLE 11

Preparation of 3-benzoyloxymethyl-7-phenylacetamidoceph-3-emoic acid

The benzyl 3 - hydroxymethyl-7-phenylacetamidoceph-3-emoate, prepared from sodium - 3 - hydroxymethyl-7-phenylacetamidoceph-3-emoate (2.5 g. 65% pure) was acylated by the procedure of Example 1 with benzoyl chloride (1 ml.) to yield, after trituration with light petroleum (B.P. 60–80°), a brown solid (2.45 g.). The infra-red spectrum (CHBr$_3$) had peaks at 1790 (β-lactam $>$C$=$O), 1730 (O.CO.φ) and 1685 cm.$^{-1}$ and paper chromatography (BCMW) showed that some 3-hydroxymethyl-7-phenylacetamidoceph - 3 - emoic acid lactone was also present.

The crude benzyl - 3-benzoyloxymethyl-7-phenylacetamidoceph-3-emoate was hydrogenolysed in the usual way with 10% palladium on charcoal (9 g.) in acetic acid (50 ml.) and hydrogen (95 ml. 87% theory) was absorbed in 15 min. The reaction mixture was worked up in the usual way and during fractionation of the ethyl acetate solution, the product together with 3-methyl-7-phenylacetamidoceph-3-emoic acid was totally extracted by N NaHCO$_3$. The solid (598 mg.) was fractionated by a "5 diamond" distribution between equal volumes (100 ml.) of ethyl acetate and 0.5 M phosphate buffer (pH 5). 3-benzoyloxymethyl - 7-phenylacetamidoceph-3-emoic acid was isolated from fractions 1–4 (EtOAc) inclusive and after washing with ether (5 ml.) was obtained as a colourless powder (296 mg.) λ max. 227, 258–260 (plateau) mμ

$$E_{1\,cm.}^{1\%}=537, 275$$

1 μg.≡2 μg. 7PACA on cup plate assay.

R$_{7PACA}$ EtOAc 1.75

Paper chromatography indicated the presence of a trace amount of faster moving inactive material (R$_{7PACA}$ 5.6).

EXAMPLE 12

Preparation of 3-(2-naphthoyloxymethyl)-7-phenylacetamidoceph-3-emoic acid

The benzyl 3-hydroxymethyl-7-phenylacetamidoceph-3-emoate, prepared from sodium 3-hydroxymethyl-7-phenylacetamidoceph-3-emoate (3 g. 65% pure) was acylated with 2-naphthoyl chloride (1.6 gm.) as in Example 1, to yield, after trituration with light petroleum (B.P. 60–80°), benzyl - 3 - (2-naphthoyloxymethyl)-7-phenylacetamidoceph-3-emoate (2.25 g.) as a light brown solid. The infrared spectrum (CHBr$_3$) had peaks 1795 (β-lactam $>$C$=$O), 1730 (O—CH—C$_{10}$H$_7$) and 1690 cm.$^{-1}$.

The solid was hydrogenolysed with 10% palladium on charcoal (7 g.) in acetic acid (50 ml) and hydrogen (36 ml. 42% theory) was absorbed in 20 min. The reaction mixture was worked up in the usual manner and on fractionation of the ethyl acetate solution the 3-(2-naphthoyloxymethyl)-7-phenylacetamidoceph-3-emoic acid, some 3-methyl-7-phenylacetamidoceph-3-emoic acid and a small amount of 2-naphthoic acid was extracted by N-NaHCO$_3$. The resulting solid (554 mg.) was fractionated by a "5 diamond" distribution between ethyl acetate (150 ml.) each phase and 0.5 M phosphate buffer (pH 5.6, 100 ml. each phase) and the 3-(2-naphthoyloxymethyl)-7-phenylacetamidoceph-3-emoic acid together with some naphthoic acid was isolated from fractions 1–3 (EtOAc) inclusive. The light brown solid (255 mg.) was washed with ether to give 3 - (2'-naphthoyloxymethyl)-7-phenylacetamidoceph-3-emoic acid (124 mg.), λ max. 235, 258–60 (plateau) mμ

$$E_{1\,cm.}^{1\%}\ 722, 178$$

1 μg.≡1.05 μg. 7PACA on cup plate assay.

R$_{7PACA}$ EtOAc 4.6

EXAMPLE 13

(a) Preparation of bis(4-methoxyphenyl)diazomethane

Bis(4-methoxy)benzophenone hydrazone was prepared by method of Baltzly et al. (J. Org. Chem. 1961, 26, 3669).

The hydrazone (17 g., 75 mM.), potassium hydroxide (45 g., 82 mM.) and mercuric oxide (25 g., 115 mM.) in ether (750 ml.), methanol (400 ml.) and water (30 ml.) were stirred vigorously for 2.5 hr. After 0.5 hr., grey sludge was apparent in the purple solution. The supernatant and sludge washings (ether) were combined and washed with 2 N-sodium hydroxide (1× 200, 4× 50 ml.). The resulting ethereal solution was concentrated to 200 ml. and kept −10° overnight to give the crystalline purple titled compound (10.1 g.), M.P. 111–113° dec. The mother liquor yielded a further crop (5.9 g.) M.P. 109–112° dec. Total yield was 16 g. (85%). Infrared absorption (in Nujol) 2030 cm.$^{-1}$. Ultraviolet absorption (in EtOH), λ max. 232, 283, $$E_{1\ cm.}^{1\%}\ 800,\ 660$$

(b) Preparation of bis(4-methoxyphenyl)methyl 3-hydroxymethyl-7-phenylacetamidoceph-3-emoate A dried solution of 3-hydroxymethyl-7-phenylacetamidoceph-3-emoic acid in ethyl acetate (1000 ml.) was prepared from its sodium salt (60% pure, 12.3 g.=20 mM. pure salt) and treated with bis(4-methoxyphenyl)diazomethane (4.8 g., 18.7 mM.) in portions over 45 min. and allowed to stand at room temperature for a further 15 min. with occasional swirling.

The solution was extracted with N/2 NaHCO$_3$ (2× 50 ml.), washed with water (2× 50 ml.), dried, evaporated to ca. 400 ml. and poured into ether (600 ml.). The precipitate (8.75 g., 76%) of the titled compound contained a small amount of 7-PACA lactone (paper chromatography, BCMW system). The crude hydroxy-ester showed infrared absorption (CHBr$_3$) at 1780 (β-lactam), 1715 (CO.O.aryl), 1670, 1600, 1530 (sh.), 1505 1242 cm.$^{-1}$.

(c) Conversion of bis(4-methoxyphenyl)methyl 3-hydroxymethyl-7-phenylacetamidoceph-3-emoate to bis(4-methoxyphenyl)methyl 3 - acetoxymethyl-7-phenylacetamidoceph-3-emoate and acid hydrolysis to 7-PACA The hydroxy-ester (1.25 g., 2.1 mM.) in dry methylene chloride (30 ml.) and pyridine (1 ml.) was treated with acetyl chloride (0.4 ml.) and the solution shaken for 1.5 hr. at room temperature. After dilution with ethyl acetate (200 ml.), the solution was extracted with N/2 NaHCO$_3$ (3× 50 ml.), washed with water (4× 50 ml.), and dried. Chromatography indicated the presence of starting material, acylation product and some 7-PACA llactone.

Evaporation of the ethyl acetate solution to ca. 30 ml. resulted in deposition of the lactone (570 mg.), M.P. 217–220 dec. The filtrate was poured into light petroleum and kept at 5° overnight to give further lactone (246 mg.), M.P. 205–211° dec. Evaporation of the mother liquor followed by washing of the product with light petroleum gave crude 7-PACA 4-ester (310 mg.) with infrared absorption essentially the same as previously described. Chromatography revealed that the crude ester contained a small amount of 7-PACA.

The crude 7-PACA ester (300 mg.) was dissolved in glacial acetic acid (10 ml.) and kept at room temperature for 18 hr. The product, isolated as described in the earlier example, was a brown foam (125 mg.). Crystallisation from acetone gave impure 7-PACA (64 mg.), λ max. 258–260 mμ, $$E_{1\ cm.}^{1\%} = 146$$

infrared absorption essentially identical to that of an authentic sample. Paper chromatography revealed only trace contaminants.

(d) Bis(4-methoxyphenyl)methyl 3-benzoyloxymethyl-7-phenylacetamidoceph-3-emoate Bis(4-methoxyphenyl)methyl 3-hydroxymethyl-7-phenylacetamidoceph-3-emoate (1.2 g., 2.1 mM.) was acylated with benzoyl chloride (1 ml.) using the procedure of (c). Chromatography indicated the presence of starting material, acylation product and 7-PACA lactone.

Isolation as usual gave 7-PACA lactone (786 mg.), M.P. 200–205°. Evaporation of the mother liquor followed by washing of the product with light petroleum gave the titled compound (286 mg.) as a brown foam, M.P. above 80° slow dec.

It showed infrared absorption (CHBr$_3$) at 1780 (β-lactam), 1735 (OCOPh), 1710 (CO.O.aryl), 1660, 1590, 1500, 1240 cm.$^{-1}$. Chromatography revealed the presence of a small amount of 3-benzoyloxymethyl-7-phenylacetamidoceph-3-emoic acid.

(e) Acid hydrolysis of bis(4-methoxyphenyl)methyl-3-benzoyloxymethyl-7-phenylacetamidoceph-3-emoate to 3 - benzoyloxymethyl - 7-phenylacetamidoceph-3-emoic acid The crude ester (275 mg.) from (d) was dissolved in glacial acetic acid (10 ml.) and kept at room temperature for 18 hr. Isolation as usual gave, from the NaHCO$_3$ soluble fraction, a light brown solid (96 mg.) which on crystallisation from acetone afforded in the titled acid (74 mg.), λ max. 227, 258–260 (plateau) mμ, $$E_{1\ cm.}^{1\%}\ 440,\ 162$$

infrared spectrum essentially identical to that previously described in Example 11 (λ max. 227, 258–260 (plateau) mμ, $$E_{1\ cm.}^{1\%}\ 537,\ 275)$$

Biological properties of the compounds prepared in the examples are shown in the following table. The *Staph. aureus* strains A and C were penicillin resistant while strain B was penicillin resistive.

| | Tube Dilution Assay (γ/ml.) | | | | | | Mouse protection (ED$_{50}$/mg./kg./dose), subcutaneous administration | |
| --- | --- | --- | --- | --- | --- | --- | --- | --- |
| | Gram positive | | | Gram negative | | | | |
| | Staph. aureus Strain A | Staph. aureus Strain B | Staph. aureus Strain C | E. coli | S. typhimurium | Pr. vulgaris | S. aureus Strain B | E. coli |
| Example No.: | | | | | | | | |
| 2 | 0.16 | 0.62 | 2 | 4 | 62.5 | 125 | >50 | >50 |
| 3 | 0.31 | 0.08 | <0.5 | 16 | 250 | 250 | 1 | >50 |
| 4 | 0.62 | 0.16 | 1 | 16 | 62.5 | 125 | >50 | |
| 5 | 2.5 | 0.62 | 8 | 31 | 250 | 250 | >50 | >50 |
| 6 | 0.31 | 0.16 | <0.5 | 16 | 62.5 | 125 | 10 | >50 |
| 7 | 1.25 | 0.31 | 4 | 31 | 250 | >250 | 2.5 | |
| 8 | 2.5 | 1.25 | 2.0 | 250 | 125 | >250 | 50 | >50 |
| 9 | 1.25 | 0.3 | 1.0 | >250 | >250 | >250 | 5 | >50 |
| 10 | 2.5 | 0.62 | 2.0 | >250 | >250 | >250 | 10 | >50 |
| 11 | 0.31 | 0.8 | 2.0 | 125 | 125 | >250 | 2.5 | >50 |
| 12 | 0.31 | 0.62 | 4 | >250 | 250 | >250 | 15 | >50 |

We claim:
1. In a process for the preparation of a cephemoic acid of the formula

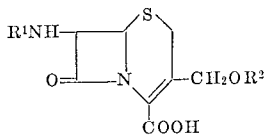

where $R^1$ and $R^2$ are each a carboxylic acyl group selected from the group consisting of $R'(CH_2)_nCO$— where $R'$ is naphthyl, tolyl, diphenyl, phenyl, dimethoxyphenyl, chlorophenyl, bromophenyl, cyclopentyl, cyclohexyl or thienyl and $n$ is 0 or an integer from 1–4, $R''CO$— where $R''$ is alkyl or alkenyl of no more than 7 carbon atoms or such alkyl or alkenyl interrupted by an oxygen or a sulphur atom, $R'O \cdot CH_2 \cdot CO$— where $R'$ is as above defined, $R'(CH_2)_nS(CH_2)_nCH_2 \cdot CO$— where $R'$ is as above defined and $n$ is 0 or an integer from 1–4 and 2-phenylpropionyl from a corresponding 3-hydroxymethyl analogue or an alkali metal salt thereof, the steps which comprise protecting the 4-carboxy group by reaction with an aralkylation agent selected from the group consisting of an aryldiazoalkane and an aralkyl chloride or bromide, the aralkyl groups of which are selected from the group consisting of benzyl, benzhydryl, triphenylmethyl and nuclear substituted methoxy derivatives thereof, to convert it to a 4-carbaralkoxy group, acylating the 3-hydroxymethyl group of the protected compound to introduce the acyl group $R^2$ and subsequently removing the aralkyl group from the 4-carbaralkoxy group.

2. A process as claimed in claim 1 wherein the aralkyl group is a

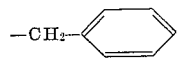

3. A process as claimed in claim 1 wherein the aralkylation agent is an aryldiazoalkane.
4. A process as claimed in claim 1 wherein the aralkylation agent is an aralkyl chloride or bromide and the 3-hydroxymethyl analogue is used in the form of its sodium salt.
5. A process as claimed in claim 1 wherein the aralkyl group is removed by catalytic hydrogenolysis.
6. Cephemoic acids of the formula

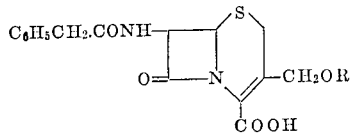

wherein R is a carboxylic acyl group of the formula:
(i) $R^1(CH_2)_nCO$— where $R^1$ is phenyl, tolyl or naphthyl and $n$ is an integer from 1 to 4,
(ii) $R^1CO$— where $R^1$ has the meaning defined above, or
(iii) diphenylacetyl, and pharmaceutically acceptable non-toxic salts thereof.
7. 3 - phenylacetoxymethyl-7-phenylacetamidoceph-3-emoic acid.
8. 3-(4 - methylbenzoyloxymethyl)-7-phenylacetamidoceph-3-emoic acid.
9. In a process for the preparation of a cephemoic acid of the formula

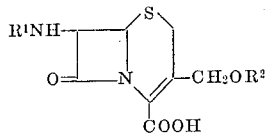

where $R^1$ and $R^2$ are each a carboxylic acyl group selected from the group consisting of $R'(CH_2)_nCO$— where $R'$ is naphthyl, tolyl, diphenyl, phenyl, dimethoxyphenyl, chlorophenyl, bromophenyl, cyclopentyl, cyclohexyl or thienyl and $n$ is 0 or an integer from 1–4, $R''CO$— where $R''$ is alkyl or alkenyl of no more than 7 carbon atoms or such alkyl or alkenyl interrupted by an oxygen or a sulphur atom, $R'O \cdot CH_2 \cdot CO$— where $R'$ is as above defined, $R'(CH_2)_nS(CH_2)_nCH_2 \cdot CO$— where $R'$ is as above defined and $n$ is 0 or an integer from 1–4 and 2-phenylpropionyl from a corresponding 3-hydroxymethyl analogue or an alkali metal salt thereof, the step which comprises protecting the 4-carboxy group by reaction with an aralkylation agent selected from the group consisting of an aryldiazoalkane and an aralkyl chloride or bromide, the aralkyl groups of which are selected from the group consisting of benzyl, benzhydryl, triphenylmethyl and nuclear substituted methoxy derivatives thereof, to convert it to a 4-carbaralkoxy group.

10. Benzyl 3-hydroxymethyl-7-phenylacetamidoceph-3-em-4-oate having the formula

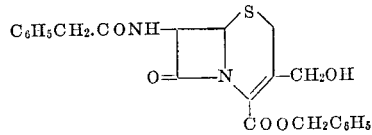

References Cited
UNITED STATES PATENTS 3,278,531 10/1966 Cox et al.
3,270,009 8/1966 Flynn _____ 260—243

NICHOLAS S. RIZZO, Primary Examiner

U.S. Cl. X.R.
424—246